United States Patent Office 3,608,386
Patented Sept. 28, 1971

3,608,386
CAM OPERATED VARIABLE RATIO BELT DRIVE
John M. Pambid and Harold E. Wiggins, Clarkston, Mich., assignors to F. Jos. Lamb Co., Detroit, Mich.
Filed July 25, 1969, Ser. No. 844,888
Int. Cl. F16h 57/10, 55/52
U.S. Cl. 74—230.17A
5 Claims

ABSTRACT OF THE DISCLOSURE

A power unit for use on machine tools having a motor flange-mounted on a housing with a self-adjusting pulley connected to a rotor shaft of the motor. The motor drives an output shaft of the power unit through a belt engaged between movable and fixed sheaves on the output shaft which provide a variable effective diameter pulley. The pulley on the output shaft is adjusted by a semi-circular cam and a cam follower connected to the movable sheave to control and vary the speed of rotation of the output shaft. Brake shoes actuated by a cam lever and a brake drum on a sheave of the output shaft selectively lock the output shaft against rotation.

---

This invention relates to a power unit for use with various machine tools and more particularly to a power unit having a variable speed output.

In constructing machine tools such as vertical milling machines, drilling machines, tapping machines, etc. it is desirable for ease of fabrication and economy of manufacture to have a standardized power drive unit which can be utilized as the driving mechanism or power source for various machine tools. In machine tools utilizing various sizes and types of cutters it is desirable for optimum performance to adjust the speed of the cutter to a desired value. Hence it is desirable that a standardized power unit have an output speed which can be readily varied and controlled.

Objects of this invention are to (1) decrease the cost of manufacture and facilitate the fabrication and assembly of machine tools, (2) provide a variable speed power unit which has only a few relatively simple component parts and hence is of economical construction, and (3) provide a variable speed power unit in which the various component parts are readily accessible to facilitate service and maintenance of the device.

These and other objects, features and advantages of this invention will become apparent from the following detailed description and the accompanying drawings in which.

Figure 1:
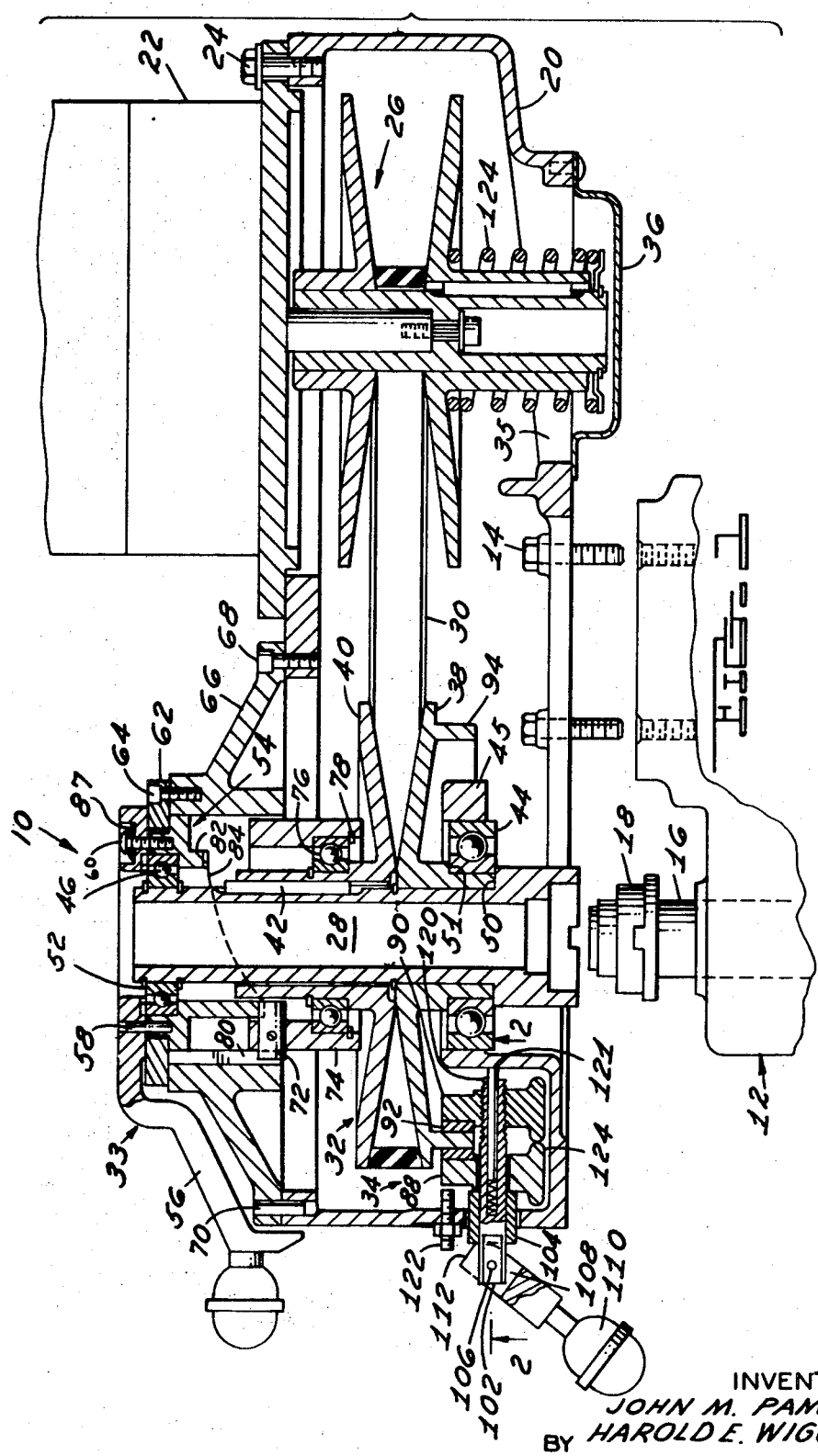
FIG. 1 is a generally vertical sectional view of a variable speed power unit, constructed in accordance with this invention, positioned to be mounted on and connected to the power input shaft of a machine tool.

In FIG. 1 a variable speed power unit 10 constructed in accordance with this invention is shown positioned to be mounted on a machine tool 12 such as a vertical mill, drilling machine, tapping machine, etc. Power unit 10 can be secured to machine tool 12 by bolts 14 and connected to a spindle 16 of the machine tool by an adapter 18. Power unit 10 has a housing 20 and a flange mounting electric motor 22 secured to the housing by bolts 24. A self-adjusting variable effective diameter V-pulley 26 of conventional construction is attached to the rotor shaft of motor 22. Motor 22 drives an output shaft 28 through a V-belt 30 and a driven variable effective diameter pulley 32 which is adjusted and controlled by a hand actuated cam mechanism designated generally as 33 mounted on housing 20. Rotation of output shaft 28 can be retarded by a brake assembly 34 mounted within housing 20.

Housing 20 is preferably a metal casting with an opening 35 to provide access to pulley 26 to facilitate service of the power unit. Opening 35 is covered by a sheet metal shield 36 removably attached to housing 20. For economy of manufacture and ease of service motor 22 is flange-mounted and self-adjusting pulley 26 is connected directly to its rotor shaft as indicated in FIG. 1. Pulley 26 is readily accessible for service through either access opening 35 or by removal of motor 22 from housing 20.

Pulley 32 has a lower sheave 38 fixed on output shaft 28, as by a press fit, for example, and an upper sheave 40 mounted by a key 42 for axial movement on and rotation with the output shaft. Output shaft 28 is journalled for free rotation by a ball bearing set 44 press fitted into a boss 45 on housing 20 and a ball bearing set 46 carried by speed control 30. The inner race of bearing 44 is seated between shoulders 50 and 51 on shaft 28 and sheave 38, respectively. The inner race of bearing 46 is fixed vertically on shaft 28 by snap rings 52 seated in grooves in the shaft.

Figure 3:
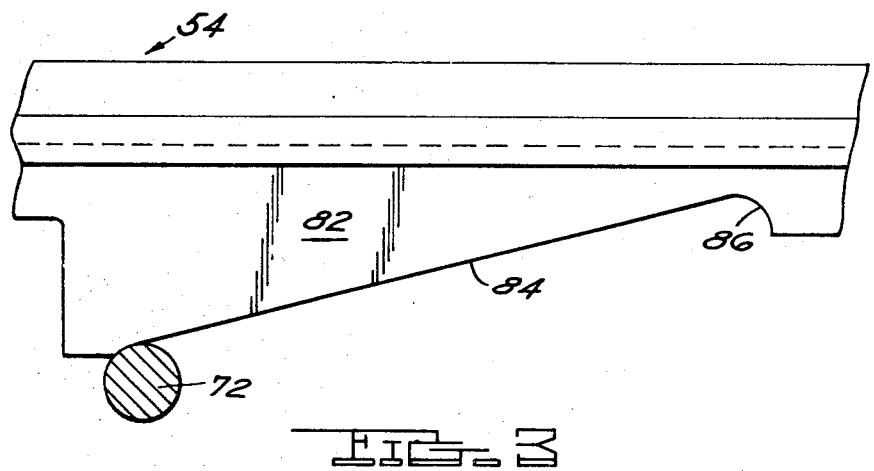
FIG. 3 is an enlarged view of a layout of a cam contour of a speed control cam of the device of FIG. 1.

Speed control mechanism 33 has an annular cam ring 54 connected to an actuating lever 56 by a dowel pin 58 and screws 60. Cam ring 54 is mounted for rotation on housing 20 by a retainer ring 62 secured to a control housing 64 by cap screws 66. Control housing 64 is attached to main housing 20 by capscrews 68 and pins 70. The lower edge of cam ring 54 bears on a follower pin 72 fixed to a collar 74. Collar 74 is connected by a bearing 76 and snap rings 78 to movable sheave 40 of pulley 32 so that sheave 40 can freely rotate with respect to and move axially with collar 74. Pin 72 extends into a vertical groove 80 in control housing 66 to prevent rotation of collar 74. Cam ring 54 has a downwardly extending semi-cylindrical portion 82, the lower edge of which is formed with an arcuate cam surface 84 which engages follower pin 72. As shown in FIG. 3 the ends of cam surface 84 are formed as stops 86 which engage pin 72 to limit the extent to which cam ring 54 can be rotated by movement of lever 56 and hence the maximum axial displacement of movable sheave 40. The frictional resistance to rotation of cam 54 is governed by the extent to which spring washers 87 are compressed by screws 60.

Figure 2:
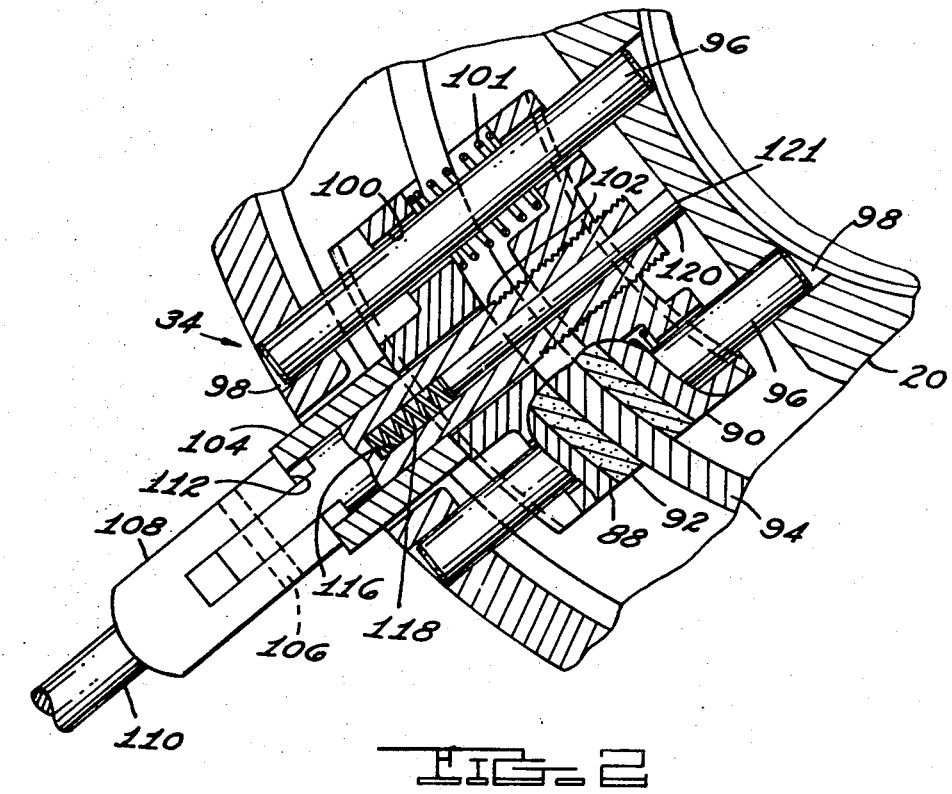
FIG. 2 is a sectional view on line 2—2 of FIG. 1 illustrating the details of construction of a cam actuated brake of the power unit of FIG. 1.

Brake mechanism 34 (as shown in FIGS. 1 and 2) has two brake shoes 88, 90 with brake linings 92 which can be urged into engagement with a circular brake drum 94 which is an integral downwardly extending cylindrical flange on lower sheave 38. Brake shoes 88, 90 are mounted in housing 20 by pins 96 pressed into holes 98 in housing 20. Pins 96 extend through oversized holes 100 in the brake shoes. Compression springs 101 are arranged on pins 96 between brake shoes 88, 90 so that the brake shoes are resiliently urged away from each other. A stud 102 extends freely through brake shoe 88 and is threaded into brake shoe 90. A collar 104 is slidably mounted on stud 102. At its outer end stud 102 is pivotally connected as at 106 to a clevis portion 108 of a handle 110. Handle 110 has cam surfaces 112 bearing on collar 104. When handle 110 is tilted from a downwardly extending vertical position to the inclined position shown in FIG. 1, brake shoe 90 is urged to the left into engagement with the inner side of brake flange 94 and brake shoe 88 is urged to the right by collar 104 into engagement with the outer side of brake flange 94. Stud 102 has an axially extending blind hole 116 in which a compression spring 118 and a freely movable pin 120 are inserted. One end of pin 120 bears on the adjacent end of spring 118 and the other end bears on housing 20 as at 121 so that in the released position the entire brake shoe assembly is urged toward an adjustable stop 122. Compression springs 101 are heavier than spring 118 and hence adjustment of stop 122 controls the position that the brake shoes assume with respect to brake drum 94 when they are disengaged from the drum. Bulbous protrusions 124 on the lower end of brake shoes 88, 90 abut with each other when the brake shoes are moved toward each other by the camming action of clevis 108 and prevent the brake shoes from becoming cocked and binding-up on either stud 102 or guide pins 96. The amount of force applied by clevis 108 to brake linings 92 can be varied in accordance with the principles of third class levers by the position of stud 102 and collar 104 with respect to the center lines of linings 92 and bulbous protrusions 124.

In operating this power unit handle 110 is manipulated so that brake shoes 88, 90 are released from and do not engage brake drum 94 on fixed sheave 38 of output shaft 28. Motor 22 is energized and power is transmitted from the motor to driven output shaft 28 through belt 30 and pulleys 26 and 32. The speed of revolution of driven output shaft 28 is carried and controlled by rotary adjustment of control lever 56 which rotates annular cam 54 causing it to bear on and axially displace collar 74 connected to movable sheave 40 of driven pulley 32. Rotation of lever 56 in one direction causes movable sheave 40 to be displaced toward fixed sheave 38 which urges belt 30 away from the center of output pulley 32 and causes the belt to move toward the center of self-adjusting pulley 26 against the bias of spring 124 of pulley 26. This movement of belt 30 increases the effective diameter of pulley 32 on output shaft 28 and decreases the effective diameter of pulley 26 on motor 22 which decreases the speed of revolution of output shaft 28. Movement of speed control lever 56 in the opposite direction causes cam 54 to be rotated so that collar 74 and movable sheave 40 on output pulley 32 are free to move away from fixed sheave 38. With the tension on belt 30 released spring 124 on self-adjusting pulley 26 causes belt 30 to move away from the center of self-adjusting pulley 26 and toward the center of output pulley 32 which forces movable sheave 40 away from fixed sheave 38 and follower pin 72 of collar 74 into engagement with cam 54. This reduces the effective diameter of output pulley 32 and increases the effective diameter of self-adjusting pulley 26 which increases the speed of revolution of output shaft 28. Hence the movement of lever 56 in either direction changes the effective diameters of both pulleys 26 and 32 and thereby varies and controls the speed of revolution of driven output shaft 28.

When motor 22 is de-energized, output shaft 32 can be brought to a rapid stop and locked in a fixed position by pivoting handle 110 to the inclined position shown in FIG. 1 to cause brake linings 92 to engage brake drum 94 connected to output shaft 28. Stud 102 may be rotated by clevis 108 to provide adjustment of the position of the brake shoes with respect to brake drum 94.

We claim:

1. A variable speed drive comprising a housing, input and output shafts supported for rotation in said housing about spaced generally parallel axes, a self-adjusting variable effective diameter pulley on one of said shafts, a fixed sheave and an axially movable sheave mounted on the other shaft providing a variable effective diameter pulley, an endless belt trained around said pulleys and providing a driving connection therebetween, a first sleeve spaced axially from said sheaves and mounted on said housing for rotation about the axis of said last-mentioned shaft, said last-mentioned shaft having one end thereof extending into said sleeve, a bearing interconnecting said one end of said last-mentioned shaft and said first sleeve and radially supporting said last-mentioned shaft for rotation relative to said sleeve, the end face of said sleeve facing said sheaves being curved in an axial direction and defining a cam surface which extends axially of the sleeve around the periphery thereof, a second sleeve journalled on said movable sheave for rotation relative thereto and connected thereto for axial movement therewith, said second sleeve extending from the movable sheave axially toward the first-mentioned sleeve, guide means interconnecting the second sleeve and said housing for preventing the second sleeve from rotating relative to the housing while permitting axial movement thereof, and a cam follower fixed on the second sleeve and engaging said cam surface at the end face of the first sleeve so as to be axially displaced thereby in response to rotation of the first sleeve to correspondingly shift said movable sheave axially of said other shaft.

2. The combination called for in claim 1 which also comprises means exterior of the housing and connected to said first sleeve for permitting manual rotation thereof.

3. The combination called for in claim 1 wherein said cam surface has a pair of axially extending abutments thereon engageable by said cam follower to limit the extent of rotation of said first sleeve and thereby limit the axial displacement of said axially movable sheave.

4. A control mechanism for a variable speed drive having a housing, spaced driving and driven shafts each supported for rotation in said housing, a pair of sheaves mounted on one of said shafts with one of said sheaves fixed to said one shaft and the other sheave axially movable with respect to said one sheave to provide a variable effective diameter pulley on said one shaft, a self-adjusting variable effective diameter pulley mounted on the other of said shafts, and an endless belt trained around said pulleys and providing a driving connection therebetween, comprising: a sleeve carried by said housing for rotation about its longitudinal axis with respect to said housing, said sleeve encircling said one shaft and having cam means thereon, a collar encircling said one shaft, a bearing mounting said collar on said axially movable sheave for generally axial movement with said axially movable sheave and for rotation of said axially movable sheave with respect to said collar, means preventing rotation of said collar with respect to said housing, and a cam follower carried by said collar and engaging said cam means of said sleeve, whereby rotation of said sleeve with respect to said housing axially displaces said axially movable sheave on said one shaft to vary the speed of said driven shaft.

5. The combination called for in claim 4 in which said sleeve has stops at opposed ends of said cam means engageable with said cam follower to limit the extent to which said sleeve can be rotated, whereby the axial displacement of said axially movable sheave is limited.

References Cited

UNITED STATES PATENTS

| | | | |
|---|---|---|---|
| 2,205,975 | 6/1940 | Heyer | 74—230.17A |
| 2,257,744 | 10/1941 | Heyer | 74—230.17A |
| 2,703,986 | 3/1955 | McClelland | 74—230.17A |
| 3,006,207 | 10/1961 | Russell | 74—230.17A |
| 3,370,485 | 2/1968 | Carawan | 74—230.17AX |
| 3,478,610 | 11/1969 | Sakai | 74—230.17A |

BENJAMIN W. WYCHE III, Primary Examiner

U.S. Cl. X.R.

188—76; 192—11, 93 A

UNITED STATES PATENT OFFICE
CERTIFICATE OF CORRECTION

Patent No. 3,608,386        Dated September 28, 1971

Inventor(s) John M. Pambid et al.

It is certified that error appears in the above-identified patent and that said Letters Patent are hereby corrected as shown below:

In the heading to the printed specification, line 4, "F. Jos. Lamb Co., Detroit, Mich." should read -- Wells-Index Corporation, Three Rivers, Mich., a corporation of Michigan --.

Signed and sealed this 1st day of August 1972.

(SEAL)
Attest:

EDWARD M. FLETCHER, JR.          ROBERT GOTTSCHALK
Attesting Officer                Commissioner of Patents